June 25, 1946.  R. H. OLLEY  2,402,840
COMBINATION SEALING AND DRAIN FITTING FOR CONDUIT LINES
Filed Dec. 30, 1942

INVENTOR.
Raymond H. Olley
BY Bodell & Thompson
ATTORNEYS.

Patented June 25, 1946

2,402,840

UNITED STATES PATENT OFFICE 2,402,840

COMBINATION SEALING AND DRAIN FITTING FOR CONDUIT LINES

Raymond H. Olley, Syracuse, N. Y., assignor to Crouse-Hinds Company, Syracuse, N. Y., a corporation of New York Application December 30, 1942, Serial No. 470,595

2 Claims. (Cl. 174—50)

This invention relates to a fitting of the type now commonly employed in sealing off one part of an electrical conduit run from another part of the run, such a fitting being disclosed in Patent No. 2,240,831 to C. H. Bissell. These fittings are employed in hazardous locations to prevent an explosion in one part of the conduit line from traveling throughout the entire line. While the fittings are effective to accomplish that result, they also possess the disadvantage of preventing condensation collecting within the conduit line from being drained off, with the result that this condensation collects at the sealing fittings and eventually causes a short circuit or ground between the conductors in the conduit line, or between the conductors and the conduit.

This invention has as an object a fitting embodying the sealing features in combination with drain means effective to drain condensation from the conduit line above the fitting.

The invention has as a further object a fitting of the type referred to embodying a particularly economical structure which is also convenient to install.

The invention consists in the novel features and in the combinations and constructions hereinafter set forth and claimed.

In describing this invention, reference is had to the accompanying drawing in which like characters designate corresponding parts in all the views.

Figure 1:
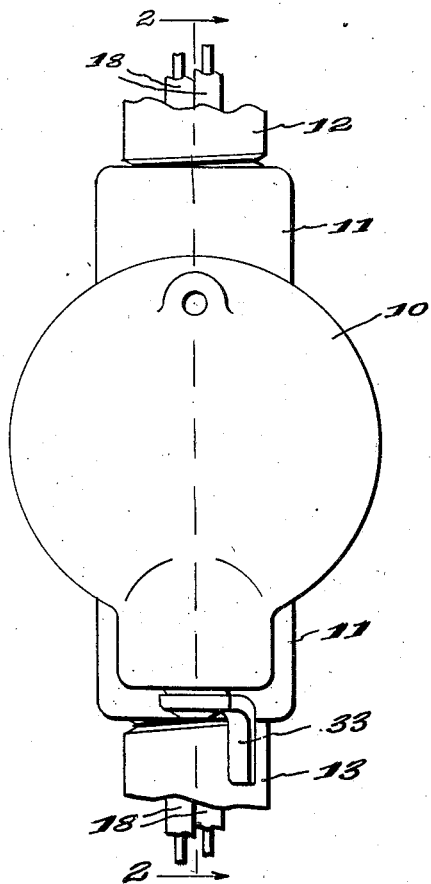
Figure 1 is a front elevational view of a fitting embodying my invention with contiguous portions of a conduit line attached thereto.

The invention consists generally of a metallic body member having the usual threaded apertures for the reception of the conduit ends. The body is formed with an opening in one side through which sealing compound may be inserted into the interior of the body, this opening being so positioned that the sealing compound levels off to effectively seal one of the conduit receiving apertures from the interior of the body. A closure for the opening is detachably secured to the body and the fitting further includes drain means having communication with the other conduit receiving aperture, whereby any condensation passing into that aperture is drained out of the fitting.

The body 10 is here shown as of substantially cylindrical formation having diametrically extending hubs 11 which are internally threaded to form apertures for the reception of the conduit ends 12, 13. One side wall of the body is formed with an opening 14 through which the sealing compound is inserted in the body. Preferably, this opening is of substantial dimension being here shown in Figure 2 as comparable to the diameter of the body, and being encircled by an annular flange 15 threaded externally to detachably receive a cover or closure 16. With the opening in the body being of such dimension, it also serves as a work opening to conveniently permit manipulation of the conductors 18 in the conduit line. If the body is initially formed with such a large opening, a partition member 24 is inserted in the opening and is, in turn, formed with a smaller opening to one side of its axis. The partition member may consist of a sheet metal disk having the central portion pressed outwardly to form a spout-like portion 25 having an opening 26 for the convenient reception of the sealing compound. The partition member 24 is inserted in the opening 14 after the conductors 18 have been installed in the conduit line, the partition being held in position by any suitable means as, for example, having the periphery of the partition positioned in an annular groove formed in the inner surface of the flange 15, the partition being readily inserted in the flange snap-fashion and with the opening 26 positioned in proximity to one of the conduit receiving apertures.

Inasmuch as there fittings are usually installed in a vertical run of a conduit line, the opening 26 is positioned upwardly in proximity to the upper conduit receiving aperture for the conduit end 12.

Figure 2:
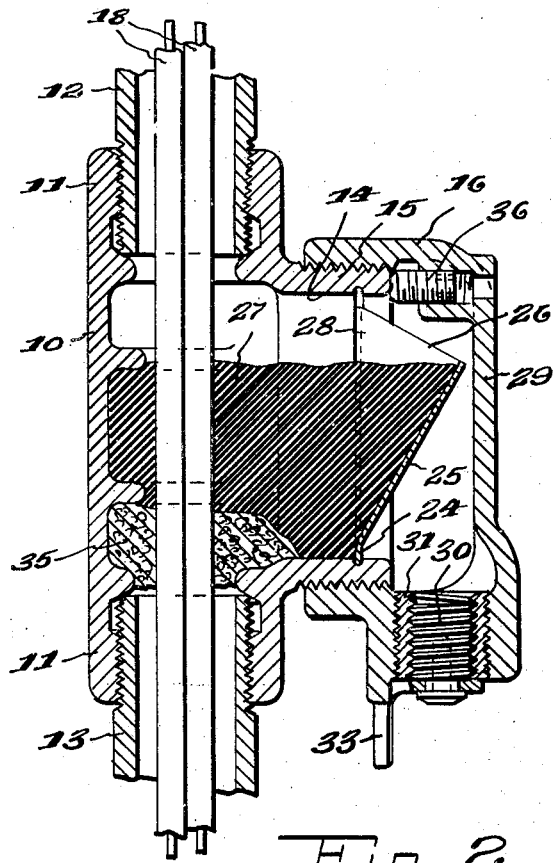
Figure 2 is a vertical sectional view taken on line 2—2, Figure 1.
Figure 4:
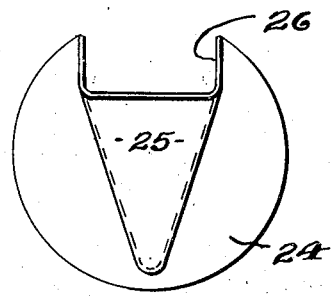
Figure 4 is an elevational view of the partition member shown in Figure 2.
Figure 3:
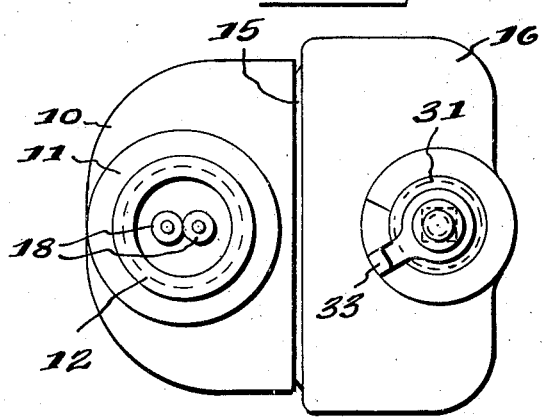
Figure 3 is a bottom plan view of the fitting.

This arrangement is such that the major portion of the interior of the body is filled with the compound 27. That is, the compound is poured into the fitting until it reaches a level determined by the upper edge of the spout portion 25, as shown in Figure 2, and thus effectively seals off the lower conduit receiving aperture from the interior of the fitting. There remains however an opening 28 through the partition member 24 above the surface of the sealing compound.

The closure member 16 effectively seals this opening in flame tight relation from the outer atmosphere. The outer wall 29 of the closure however is spaced slightly from the outer edge of the portion 25 of the partition member, and the closure is provided with drain means whereby any condensation collecting on the surface of the compound 27 passes through the aperture 28 and is then drained out of the fitting.

The drain means here shown is in the nature of a plug 30 loosely threaded in an aperture extending through the closure 16 or in a bushing 31 which, in turn, is threaded into the closure. Due to the loose fit between the plug 30 and the bushing 31, any condensation collecting above the plug readily passes between the plug and the bushing. This threaded connection however effecting a tortuous path whereby the interior of the fitting is sealed from the outer atmosphere in flame tight relation.

The plug may be provided with a small handle member 33 by means of which the plug can be oscillated in the bushing to dislodge any accumulation of dirt or corrosion that may collect on the threads of the plug.

It will be understood that after the conductors 21 have been pulled through the line a suitable dam 35, usually of asbestos fiber or like material, is packed around the conductors in the bottom of the interior of the body. The partition member 24 is then snapped into place and the sealing compound poured through the opening 26 until it reaches the upper edge of the struck-out portion 25. The closure 16 is then threaded upon the body and positioned so that the drain plug 30 is downwardly, as indicated in Figures 1 and 2, and thereupon the closure 16 is secured in position by tightening the set screw 36, as indicated in Figure 2. While the conduit 13 is effectively sealed off from the interior of the body and from the conduit 12, any condensation collecting on the top of the compound is readily drained from the interior of the fitting.

What I claim is:

1. A combination sealing and drain fitting for electric conduit lines comprising a body member formed with conduit receiving apertures, said body being also formed with an opening in one side thereof, a partition member arranged in said opening and having an aperture to permit insertion of sealing compound into the body member, said aperture being so positioned to cause the sealing compound in the body to effectively seal one of said conduit receiving apertures from the interior of the body, a cover for said opening detachably secured to the body, a condensate drain carried by the cover and communicating through the aperture in said partition with the other of said conduit receiving apertures.

2. A sealing fitting for electrical conduit lines comprising a body member formed with conduit receiving apertures and an annular hub portion extending laterally from the body and forming an opening of considerable dimension to provide access to the interior of the body, a partition member comprising a disk of sheet material detachably mounted snap-fashion in said hub, and said partition being formed with a sealing compound filling aperture, said partition serving to retain the sealing compound in the body, a closure for said opening comprising a cap threaded on said hub portion, and drain means mounted in said cap.

RAYMOND H. OLLEY.